(No Model.)
C. E. BARNES.
HOOK AND EYE.
No. 491,399. Patented Feb. 7, 1893.
Fig. 1.
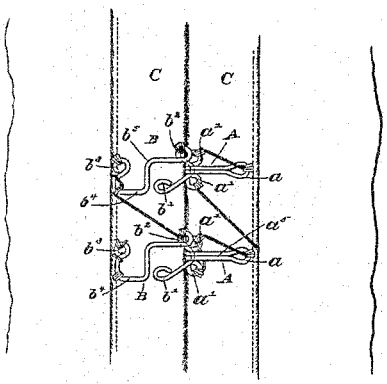
Fig. 2.
Fig. 4.  Fig. 3.  Fig. 5.
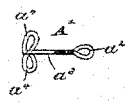 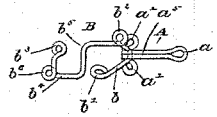 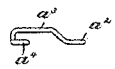
Witnesses
Edw. S. Duvall, Jr.
Wm. L. Boyden
Inventor
Charles E. Barnes
per Fred E. Tasker
Attorney (No Model.)
N. L. BECK.
HARROW.
No. 491,400. Patented Feb. 7, 1893.
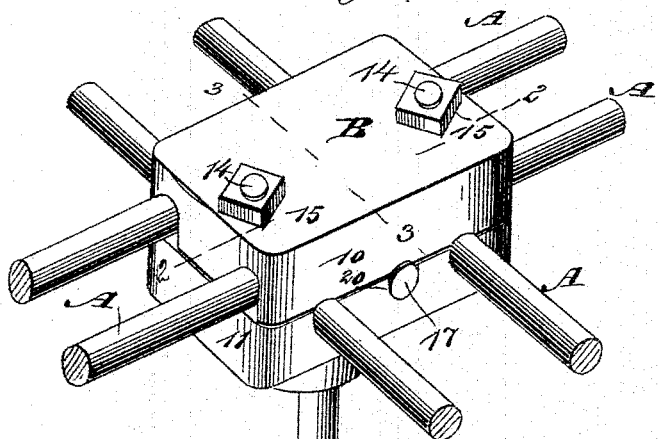
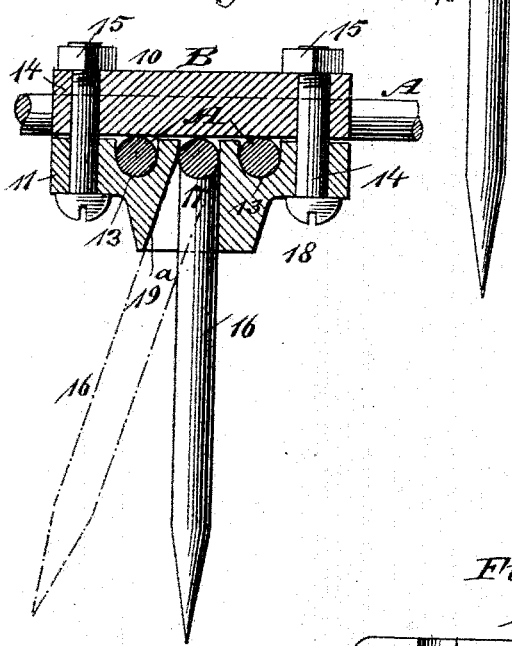
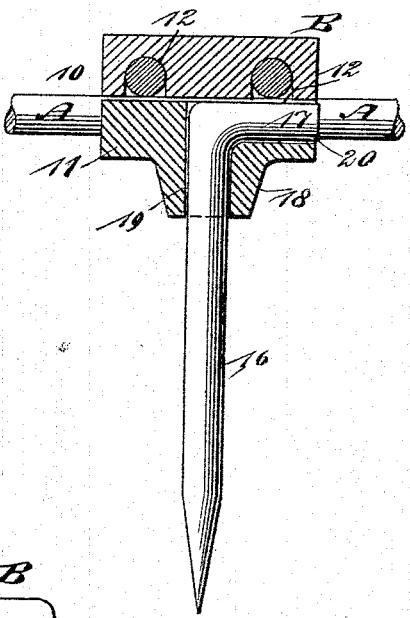
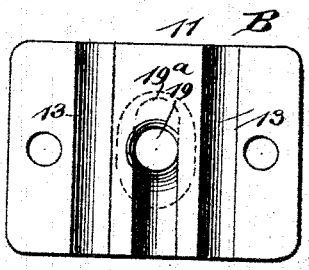
WITNESSES:
Paul Johast
C. Sedgwick
INVENTOR
N. L. Beck
BY
Munn & Co
ATTORNEYS.